Feb. 10, 1925.

H. DIXON

PHOTOGRAPHIC CAMERA

Filed Dec. 19, 1923

Inventor

Henry Dixon

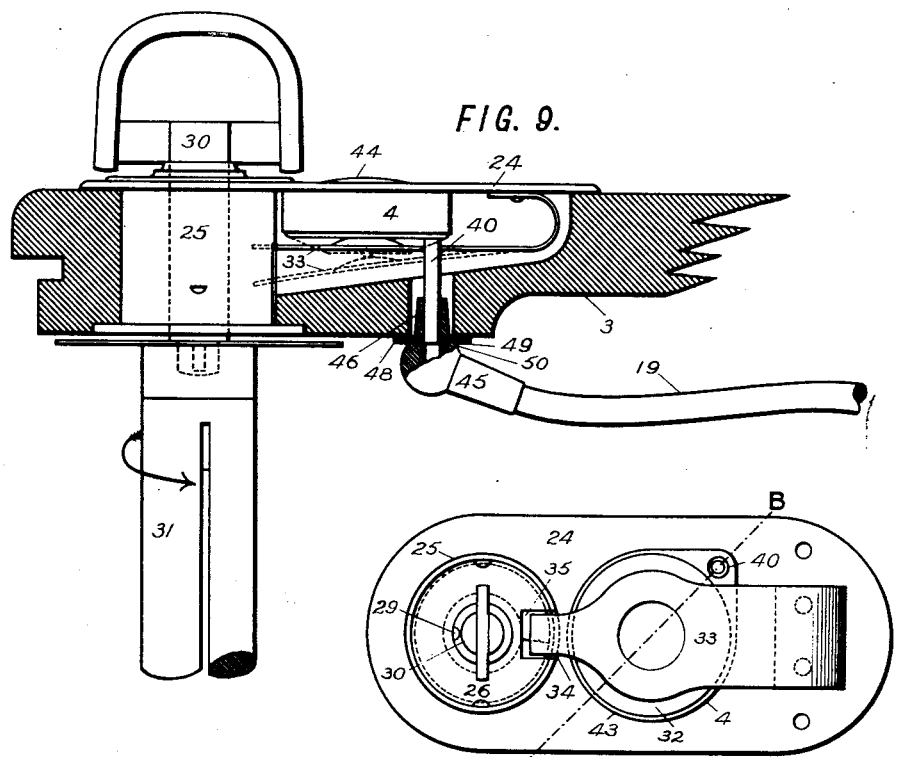
FIG. 9.
FIG. 10.
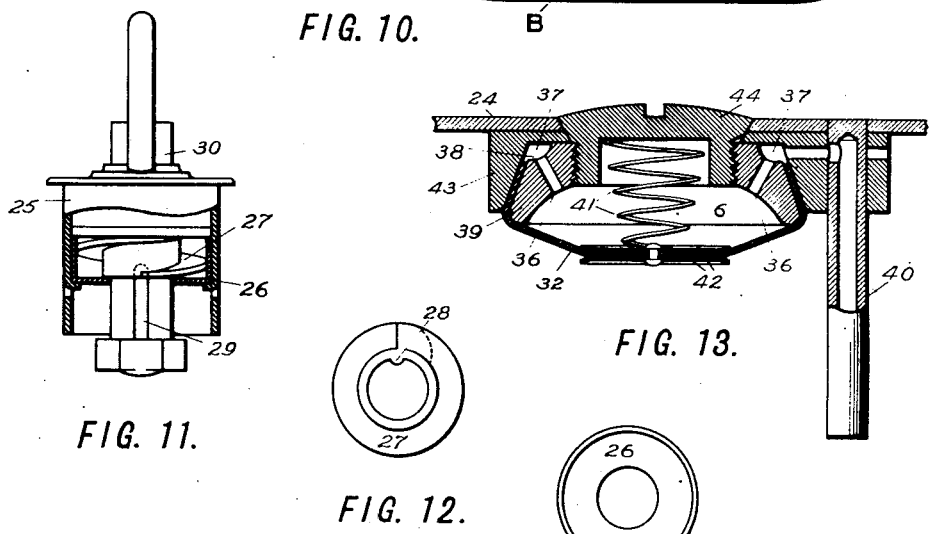
FIG. 11.
FIG. 12.
FIG. 13.
FIG. 14.
Inventor
Henry Dixon Feb. 10, 1925.

H. DIXON

PHOTOGRAPHIC CAMERA

Filed Dec. 19, 1923

Inventor
Henry Dixon

Patented Feb. 10, 1925.

1,525,924

UNITED STATES PATENT OFFICE.

HENRY DIXON, OF TORONTO, ONTARIO, CANADA, ASSIGNOR TO W. MURRAY ALEXANDER AND GEORGE O. MERSON, BOTH OF TORONTO, ONTARIO, CANADA.

PHOTOGRAPHIC CAMERA.

Application filed December 19, 1923. Serial No. 681,662.

*To all whom it may concern:*

Be it known that I, HENRY DIXON, of the city of Toronto, in the county of York and Province of Ontario, Canada, have invented certain new and useful Improvements in Photographic Cameras; and I do hereby declare that the following is a full, clear, and exact description of the invention, such as will enable others skilled in the art to which it appertains to make and use the same, reference being had to the accompanying drawings forming part of this specification.

This invention relates to photographic cameras of the type in which successive portions of an actinically sensitized medium are consecutively brought into position for exposure, and more especially the incorporation of improved pneumatic means to- co-ordinate the functions of the shutter, the positioning of the consecutive portions of the sensitized medium or film roll, and the operation of a suitable indicia visible.

The primary object of my invention is to facilitate the prevention of "blanks" or superimposed exposures, and to this end provision is made through means, actuated when the shutter is operated, to dispose a visible indicator which remains set until the next unexposed portion of the sensitized film is moved into position for exposure, and thereby automatically indicate to the operator at all times whether that portion of the film within the field of the lens has been exposed or not.

A further object is to provide in a device of the nature indicated means to perform the function of a piston without engaging parts, and thereby overcome the uncertainty of action occasioned by the presence of minute particles of dust or oxidation which is characteristic of small reciprocating mechanism when actuated by a relatively low pressure.

It is also the object of the invention to provide a device of the nature indicated which is simple in construction, highly efficient, and comparatively quite inexpensive to embody in various standard types of folding cameras adapted for film rolls.

The foregoing and other features of my invention will be understood by referring to the accompanying drawings forming part of this specification, in which similar characters of reference indicate corresponding parts in all the views, and in which:

Fig. 9 is a detail sectional view of the camera housing and showing the film-winding device.

Fig. 10 is an inverted plan view of the film-winding device and the associated mechanism of the indicator.

Fig. 11 is a detail view in partial section of the film-winding device showing the incorporated parts of the mechanism of the indicator.

Fig. 12 is a detail plan view of the spiral form of actuating-cam.

Fig. 13 is an enlarged detail sectional view of the pneumatic actuator of the indicator, taken on the line B—B of Fig. 10.

Fig. 14 is a detail view in plan of the inverted cap for supporting the actuating-cam.

Figure 8:
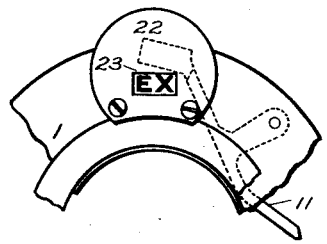
Fig. 8 is a detail fragmentary view showing a modification of the indicia visible as viewed through the sight opening in the speed dial.
Figure 15:
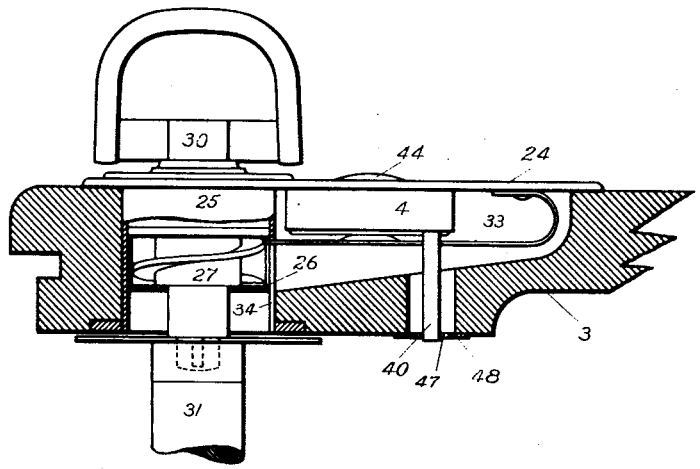
Fig. 15 is a view similar to Fig. 9 but showing more fully the cooperation of the mechanism of the indicator associated with the film-winding device.
Figure 16:
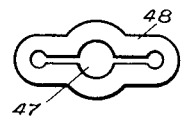
Fig. 16 is a detail view of the collet plate of the swivelled connecting piece of the flexible air conduit.
Figure 17:
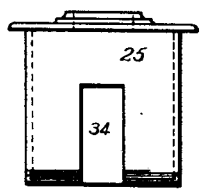
Fig. 17 is a detail view of the barrel of the film-winding device.
Figure 18:
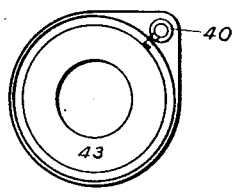
Fig. 18 is a plan view in detail of the base piece of the pneumatic actuator.
Figure 19:
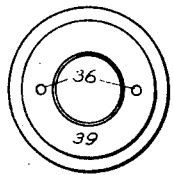
Figs. 19 and 20 are detail views of the annular insert showing both sides thereof.
Figure 20:
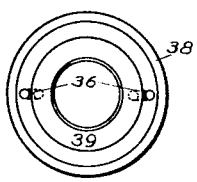
Figure 21:
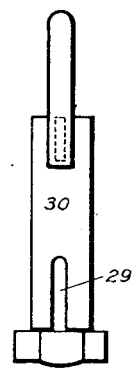
Fig. 21 is a detail view in elevation of the winding key.

In constructing a practical embodiment of my invention in accordance with the illustrated example, an automatic exposure indicator is provided, and pneumatically-energizing means to coordinate the functions of an indicia visible with the positioning for exposure of the consecutive portions of a film roll. The parts of the indicator having more immediately to do with a camera shutter are mounted upon the inner face of the cover 1 of a shutter casing 2, and adapted in construction to conform to the limited space available within the shutter casing. While the parts of the indicator associated with a film-winding device are mounted within the housing 3 of a camera, in part the means for operating through the medium of a flexible air conduit a visible signal coincident with the positioning of a film for exposure. The mechanism of the indicator may be incorporated with an ordinary type of folding camera without materially altering its construction or affecting the operation or arrangement of its mechanism, so disposed as to be inconspicuous and free from damage, and should it by any means become inoperative further use of the camera in the customary way will not thereby be impeded, which is a desideratum. It is to be understood that the device is not limited to use with a camera constructed as indicated in the drawings, various changes might be made in the details of the device, for example the modification shown in Fig. 8, without departing from the spirit of the invention.

In order to differentiate, the parts of the indicator which function pneumatically are referred to as the actuator and actuated elements throughout the specification. The actuator and actuated elements 4 and 5 (respectively) comprise primarily shallow air-chambers 6 and 7, (respectively) formed by saucer-like depressions which are adapted to be enclosed by diaphragms of flexible material, preferably leather, to form the active members thereof. The said actuator and actuated elements in so far as their respective functions will permit are similar in construction and analogous to that of a bellows in mode of operation; a construction in which is eliminated the engagement of parts in reciprocal relation. The air-chambers 6 and 7 to function properly should be of different capacities, (as shown) to attain the requisite displacement of air by the actuator element 4 to adequately operate the actuated element 5 and compensate for the loss incurred, due to the amount of air allowed to escape so that neutralization of pressure is attained within the air-train immediately following the operative period. The air-escape or vent in the air-train permits of independent action by the said actuator and actuated elements to the extent of the escapement provided, and by reversion the former element is permitted to move into its operative position without effecting a negative pressure within the air-train.

Figure 1:
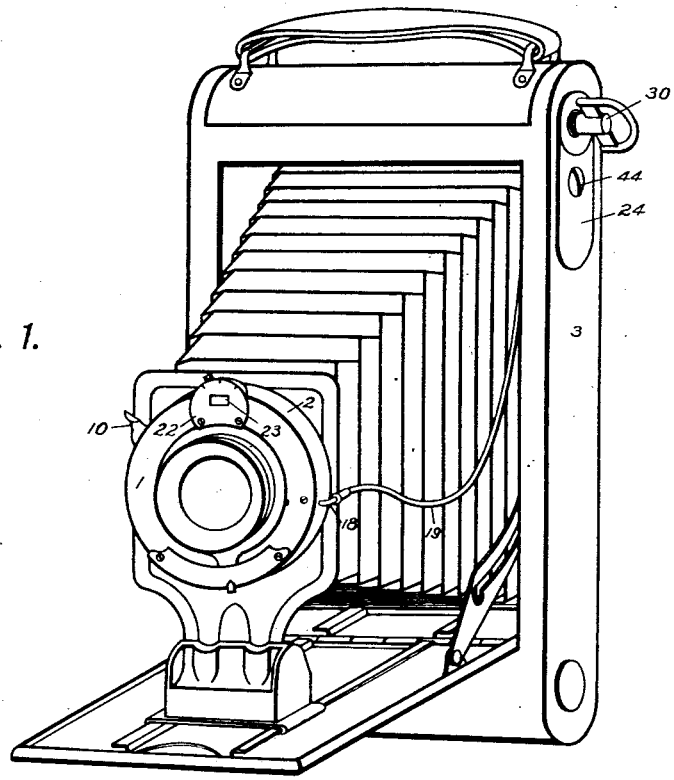
Fig. 1 is a perspective view of a conventional type of folding camera adapted for a film roll, shown in an extended position, and having the present improvements incorporated therewith.
Figure 2:
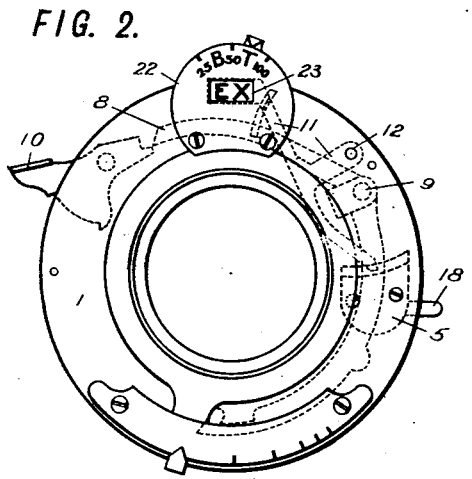
Fig. 2 is a front elevation of a camera shutter showing the parts of the mechanism having more immediately to do with the exposure indicator, in the position they assume when the finger piece operating lever is depressed at the instant of exposure.
Figure 3:
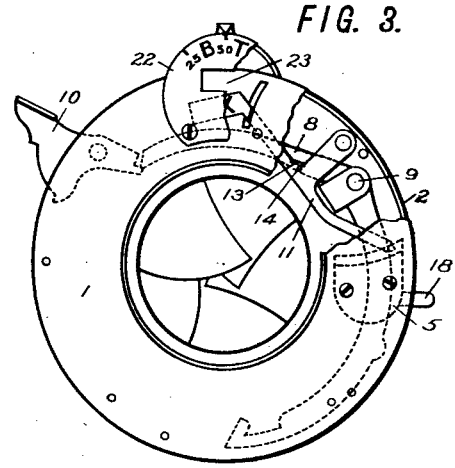
Fig. 3 is a view similar to Fig. 2, but showing the parts of the mechanism in their normal position.
Figure 4:
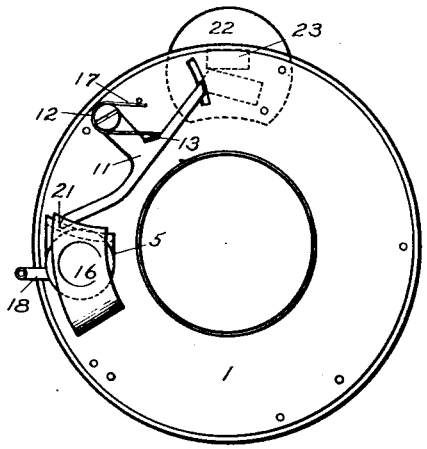
Fig. 4 is a rear elevation of the front or cover of the shutter casing showing the parts of the indicator mounted thereon and in their normal position.
Figure 5:
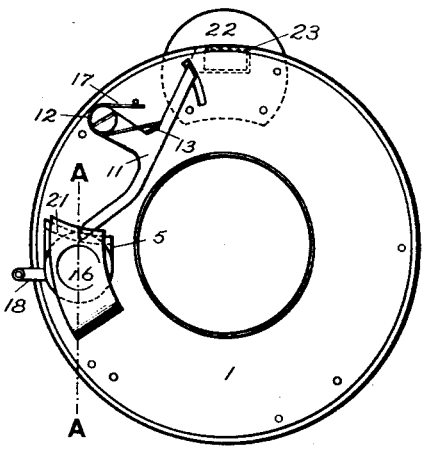
Fig. 5 is a similar view to Fig. 4, showing the parts of the indicator in the position they assume when registering an exposure.
Figure 7:
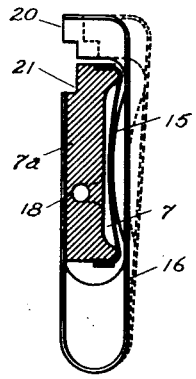
Fig. 7 is an enlarged sectional view of the pneumatically-actuated releasing mechanism of the indicator, taken on the line A—A of Fig. 5.
Figure 6:
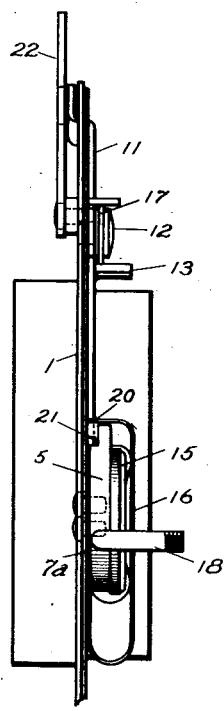
Fig. 6 is a fragmentary view in side elevation of Fig. 5, somewhat enlarged.

In the type of shutter shown in the drawings, the lever 8, which is a master member of the shutter mechanism, is pivotally mounted on a stud 9 and provided with an actuating end adapted for engagement with an operating finger piece 10, the depression of which actuates the master member in order that the shutter mechanism may be operated. Substantially over the lever 8, and with its free end projecting exteriorly of the cover 1, through an elongated slot therein, there is a lever 11 as shown, the indicia carrying member of the indicator, which is pivotally mounted on a stud 12, and provided with an inwardly-projecting lug 13 adapted for a one way engagement with a small stud pin 14 integral with the lever 8, so that the initial operation of the shutter for each exposure moves the indicia carrying member or lever 11 into locked position, as best shown in Fig. 2. The indicia visible will not be changed until the lever 11 is moved into its normal position, as shown in Fig. 3. It will be apparent that air pressure within the air-chamber 7 will distend the flexible diaphragm 15 and actuate the locking member 16, and release the lever 11 which is carried into normal position by an actuating-spring 17. In order to actuate the diaphragm 15, the base piece 7ª of the air-chamber 7 is provided with a communicating tube 18, the tube extending exteriorly of the shutter casing 2 in the form of an elbow adapted for screw-threaded engagement with the ferruled end piece of the flexible air conduit 19. The preferred form of the locking member 16 is clearly shown in the drawings, a form that is advantageous in providing stability for retaining the lever 11 when in locked position, and one that is sufficiently flexible to respond readily to the action of the diaphragm 15. The free end of the locking member 16 has a detent 20 positioned for engagement with the lever 11 when in locked position, and to insure certainty of action between the engaging parts, an arcuate guideway 21 is provided for the reciprocally operating end of the lever 11 within the shutter casing 2.

Mounted upon and supported slightly in advance of the front of the cover 1, is a speed dial 22 as shown. In taking advantage of this form of construction, a sight opening 23 is provided through which is viewed the signal indicating the condition of the film by means of a suitable indicia—such as the abbreviation "EX" for exposed or indicia of like import.

In order to secure the ensemble of indicator parts associated with the film-winding device, a supplemental plate 24 is provided. Said plate has adjacent to one end thereof a circular opening through which extends a barrel 25, the customary mounting for the mechanism of the film-winding device, which with its small annular flange resting in contact therewith provides a ready means for fastening the said plate to the housing 3 of the camera. In that portion of the barrel 25 unoccupied by mechanism of the film-winding device is secured an inverted cap 26, within which, and supported so as to rotate freely therein, there is a spiral form of actuating-cam 27, which is provided with a detent 28 for engagement with a groove 29 formed in the winding key 30. It will be seen that as the winding key 30 is rotated, it will cause the rotation of the actuating-cam 27; and furthermore, that the winding key is free to move longitudinally to effect engagement and disengagement with the end of a film spool 31, which is detachably held in place and operated thereby in the usual manner. Adjacent to the barrel 25, the plate 24 has mounted thereon the actuator element 4, and further removed towards the opposite end of the plate and made fast thereto, and adapted to interact with a flexible diaphragm 32, there is a resilient member 33, which is formed and positioned so that its free end will project interiorly of the barrel 25 through superimposed openings 34 and 35 and engage the actuating-cam 27 as shown.

For assembling the film-winding device with the plate 24, provision is made in the barrel 25 by extending the opening 34 to permit the entry of the projecting free end of the resilient member 33 from the inner edge thereof; also, a portion of the end of the inverted cap 26 is cut away coincident with its opening 35 for the passage of the said end of the resilient member 33.

Thus as the winding key is rotated the resilient member 33 is brought into tension by the action of the inclined-plane of the actuating-cam 27, with gradually increasing magnitude until the point of release is reached, preferably a cycle of one revolution, when the stored energy is spent contracting the air-chamber 6 and compressing the air contained therein by means of the flexible diaphragm 32. The compressed-air flows from the air-chamber 6 by way of air-ducts 36, and a communicating passage 37 formed by chamfering an edge 38 of an annular insert 39, and thence through a tubular extension 40, at which point it enters the flexible air conduit 19. The flexible diaphragm 32 is forced outwardly by and maintained in contact with the resilient member 33, by means of a restoring spring 41. To prevent undue wear of the flexible diaphragm 32 through contact with the resilient member 33 and the restoring spring 41, there are oppositely-disposed contact-plates 42 as shown, centrally located and integral with the said flexible diaphragm.

In Fig. 13 there is shown a means for fastening the actuator element 4 to the plate 24, and for securing the ensemble of its parts—that is, the flexible diaphragm 32, the annular insert 39 and a base piece 43—by a single countersunk screw of proportionately large diameter, in screw-threaded engagement with the said annular insert, and designated by the numeral 44.

It is preferable that the flexible air conduit 19 should be detachably connected with the actuator and actuated elements 4 and 5, so that in the event of it becoming defective by damage or oxidation, or in any way, a new one may be readily substituted therefor. The detachable connection having more immediately to do with the actuator element 4 comprises a swiveled terminal piece 45, which is adaptable to self-adjustment so that the flexible air conduit may readily conform to the relative positions of the actuator and actuated elements, whether the camera is in an extended or closed position. Said terminal piece 45 has an angularly-projecting sleeve 46, which is adapted for extending through a distensible opening 47 formed in a flexible collet plate 48, which is made fast to the interior wall of the housing 3, with its said opening 47 positioned concentric to the tubular extension 40. To prevent the terminal piece 45 from being too readily withdrawn from engagement with the collet plate 48, and to allow it to swivel freely therein while in telescopic engagement with the tubular extension 40, there is a circular recess or groove 49 coincident with a shoulder 50 to arrest further ingress when inserted, and when in contact with the said collet plate it will position the sleeve 46 with respect to the groove 49 formed therein, so that the latter will receive in detachable engagement therewith the inner peripheral edge of the distensible opening 47. Between the walls of the tubular extension 40 and the sleeve 46 when in telescopic engagement there is sufficient play to allow of the escape of air, which provides a comparatively small opening adapted to form the air-escape hereinbefore mentioned. This form of opening or vent in the air-train is preferable, for in addition to providing a suitable air-escape, it is also convenient to construct and insures a freely fitting connection in which friction is reduced to a minimum.

From the foregoing it will be seen that a device is presented that will indicate the actinic condition of the film within the field of the lens, and that means are provided for operating the visible signal coincident with exposure or the positioning of the film.

It is obvious that my invention may be adapted to various shutter actuating devices, and that it does not prevent the taking of either what are known as "bulb" or time exposures, although the latter requires a further operation of the shutter mechanism to complete an exposure.

What I claim is:

1. In a camera, shutter operating mechanism, an indicator adapted for engagement with the shutter operating mechanism and movable into position to display indicia indicating whether or not the film has been exposed, a locking member for releasably retaining said indicator in position to indicate an exposure, a pneumatically-actuated element engageable with said locking member, an actuating-spring for moving said indicator out of position, film-winding mechanism, a pneumatically-energizing element adapted for actuation by the film-winding mechanism, and a connecting flexible air conduit for coordinating the respective functions of said pneumatic elements to display suitable indicia to indicate the actinic condition of the film.

2. In a camera, shutter operating mechanism, an indicator adapted for engagement with the shutter operating mechanism and movable into position to display suitable indicia or out of such position, a locking member for releasably retaining said indicator in position to indicate an exposure, a pneumatically-actuated element engageable with said locking member to release said indicator, an actuating-spring for moving said indicator out of position, film-winding mechanism, a pneumatically-energizing element adapted for actuation by the film-winding device, a flexible air conduit for operatively connecting said pneumatic elements, and means for effecting a normal air-pressure throughout said connected pneumatic elements other than during an actuation period.

3. In a camera, shutter operating mechanism, an indicator adapted for engagement with the shutter operating mechanism and movable into position to display suitable indicia or out of such position, a locking member for engagement with said indicator, a pneumatically-actuated element for disengaging said locking member and releasing said indicator, an actuating-spring for retracting said indicator, film-winding mechanism, a pneumatically-energized element adapted for actuation by the film-winding device, a connecting flexible air conduit for co-ordinating the respective functions of the said pneumatic elements, and means communicating with one of said pneumatically energized elements and permitting the escape of air therefrom.

4. In a camera, shutter operating mechanism, a pivotally mounted indicia member for engagement with the shutter operating mechanism, a locking member for releasably retaining said indicia member in position to indicate an exposure, a pneumatically-actuated element engageable with said locking member to release said indicia member, an actuating-spring for retracting said indicia member, a film winding device, a pneumatically-energizing element adapted for actuation by the rotation of the film-winding device, and a connecting flexible air conduit for co-ordinating the respective functions of said pneumatic elements to display suitable indicia to indicate the actinic condition of the film.

5. In a camera, shutter operating mechanism, a pivotally mounted indicia member for engagement with the shutter operating mechanism, a locking member for releasably engaging said indicia member in operative position to indicate an exposure, a pneumatically-actuated element for disengaging said locking member and releasing said indicia member, an actuating-spring for retracting said indicia member, a resilient member, a film-winding device, a pneumatically-energizing element adapted for actuation by said resilient member, means operatively connecting said resilient member and the film winding device, and a connecting flexible air conduit for co-ordinating the respective functions of said pneumatic elements to display suitable indicia to indicate the actinic condition of the film.

6. In a camera, shutter operating mechanism, a pivotally mounted indicia member for engagement with the shutter operating mechanism, a locking member for releasably engaging said indicia member when in position indicating an exposure, a pneumatically-actuated element for disengaging said locking member and releasing said indicia member, an actuating-spring for retracting said indicia member, a pneumatically energizing element in which is eliminated the engagement of parts in reciprocal relation, a film-winding device, an actuating member for engagement with said pneumatically-energizing element, means operatively connecting said actuating member and the film-winding device, and a flexible air conduit for operatively connecting said pneumatic elements.

7. In a camera, shutter operating mechanism, an indicator adapted for engagement with the shutter operating mechanism and movable into position to display suitable indicia indicating an exposure or out of such position when an unexposed portion of a film roll is brought into the field of the lens, actuator and actuated pneumatic elements in which are eliminated the engagement of parts in reciprocal relation, a film-winding device comprising a key, means actuated by the rotation of the winding key of said film-winding device for operatively engaging said actuator element, a retaining means, a spring means, and means operated by said actuated element to release said retaining means and said spring means for restoring said indicator to normal position.

8. In a camera, shutter operating mechanism, an indicator movable into position to display suitable indicia or out of such position, means for a one way engagement with the shutter operating mechanism to shift the indicator into operative position, a retaining means, a spring means, an air-chamber comprising a flexible diaphragm for pneumatically releasing said retaining means and said spring means for restoring said indicator to normal position, a compression air-chamber comprising a flexible diaphragm normally distended, a film-winding device, and means actuated by the film-winding device for operatively engaging said flexible diaphragm of said compression air-chamber.

9. A camera exposure indicator comprising shutter operating mechanism, a pivotally mounted member movable into position to display suitable indicia or out of such position, means for a one way engagement with the shutter operating mechanism to shift the said indicator into operative position, a pneumatically-actuated element comprising an air-chamber comprising a flexible diaphragm, a locking member adapted for engagement with said element, a pneumatic actuator element comprising a flexible diaphragm normally distended and closing a compression air-chamber, a spiral actuating-cam, a resilient member for engagement with said spiral actuating-cam, a film-winding device comprising a key, said actuating-cam being slidably mounted and operatively engaged to rotate with said key, and a flexible air conduit for operatively connecting said pneumatic elements.

10. The combination with a camera, comprising a housing, a door shiftable into a position at right angles to the housing, a bellows and lens slidably mounted upon said door, a shutter casing mounting said lens, shutter operating mechanism, a film-winding device comprising a key, and a speed dial, said dial being formed with a sight opening, of means actuated by the said shutter operating mechanism to display suitable indicia across the field of said sight opening, and means for returning said indicia to normal, said latter means comprising actuator and actuated pneumatic elements, an actuating-cam operatively engaged with said key, and a resilient member for engagement with said actuating-cam.

HENRY DIXON.